(12) United States Patent
Crooks

(10) Patent No.: US 7,658,455 B2
(45) Date of Patent: Feb. 9, 2010

(54) TRACTION ENHANCEMENT DEVICE

(76) Inventor: Jeffrey J. A. Crooks, 682 Stevens Street, Hawkesbury, Ontario (CA) K6A 8N1

( * ) Notice: Subject to any disclaimer, the term of this patent is extended or adjusted under 35 U.S.C. 154(b) by 0 days.

(21) Appl. No.: 11/844,895

(22) Filed: Aug. 24, 2007

(65) Prior Publication Data
US 2009/0051218 A1 Feb. 26, 2009

(51) Int. Cl.
*B60C 27/08* (2006.01)
*B60C 27/00* (2006.01)
*B62D 55/04* (2006.01)
*B62D 55/253* (2006.01)
*B62D 55/12* (2006.01)

(52) U.S. Cl. .................. 305/195; 301/41.1; 301/52; 305/40; 305/193; 305/160; 152/220; 152/225 R

(58) Field of Classification Search ........ 301/41.1, 301/52, 36.3; 305/159, 160, 161, 185, 187, 305/50, 193, 195, 196, 197, 198, 200, 201, 305/7, 15, 194, 181, 40, 199; 152/220, 221, 152/222, 223, 224, 225 R, 226; 180/9.62, 180/9.21; 474/161, 162
See application file for complete search history.

(56) References Cited

U.S. PATENT DOCUMENTS

| | | | | | |
|---|---|---|---|---|---|
| 1,329,766 | A | * | 2/1920 | Holmes | 152/220 |
| 1,610,333 | A | * | 12/1926 | Smith | 152/170 |
| 1,687,834 | A | * | 10/1928 | Frederickson | 305/49 |
| 2,008,210 | A | * | 7/1935 | Hipkins | 152/220 |
| 2,124,708 | A | * | 7/1938 | Peter | 305/200 |
| 2,433,409 | A | * | 12/1947 | Walker | 305/49 |
| 2,455,307 | A | * | 11/1948 | Irvin | 305/45 |
| 2,854,294 | A | * | 9/1958 | Bannister | 305/53 |
| 2,992,863 | A | * | 7/1961 | Fredricks et al. | 305/195 |
| 3,093,423 | A | * | 6/1963 | Adams | 305/200 |
| 3,387,896 | A | * | 6/1968 | Sobota | 305/160 |
| 3,601,212 | A | * | 8/1971 | Peterson et al. | 180/9.44 |
| 3,696,852 | A | * | 10/1972 | Oulman | 152/220 |
| 3,750,734 | A | * | 8/1973 | McCord | 152/220 |
| 4,241,956 | A | * | 12/1980 | Meisel, Jr. | 305/181 |
| 4,408,646 | A | | 10/1983 | Forsyth | |
| 4,452,495 | A | * | 6/1984 | Orlandea | 305/196 |
| 4,671,774 | A | | 6/1987 | Owsen | |

(Continued)

FOREIGN PATENT DOCUMENTS

DE 4442522 A1 * 6/1996

*Primary Examiner*—S. Joseph Morano
*Assistant Examiner*—Kip T Kotter
(74) *Attorney, Agent, or Firm*—Dale J. Ream

(57) ABSTRACT

An enhanced traction device for use with a vehicle having dual tandem wheels includes a series of generally parallel track pads, each track pad having an alignment portion and a traction portion defining first and second ends. Each traction portion includes an inner surface for contacting the vehicle wheels and an outer surface for contacting ground. Each alignment portion extends away from a respective traction portion outer surface and is configured to pass between the dual wheels. The alignment portions maintain proper positioning of the track pads upon the dual tandem wheels of the vehicle. The traction device further includes a first chain coupled to each respective track pad first end for maintaining a predetermined spacing between said track pad first ends. Similarly, the traction device includes a second chain coupled to each track pad second end for maintaining a predetermined spacing between the track pad second ends.

3 Claims, 8 Drawing Sheets

U.S. PATENT DOCUMENTS

| | | | |
|---|---|---|---|
| 4,752,105 A * | 6/1988 | Barnard ...................... 305/160 |
| 4,813,466 A | 3/1989 | Forsyth et al. |
| 5,005,921 A * | 4/1991 | Edwards et al. ............. 305/170 |
| 6,540,310 B1 * | 4/2003 | Cartwright .................. 305/180 |

* cited by examiner

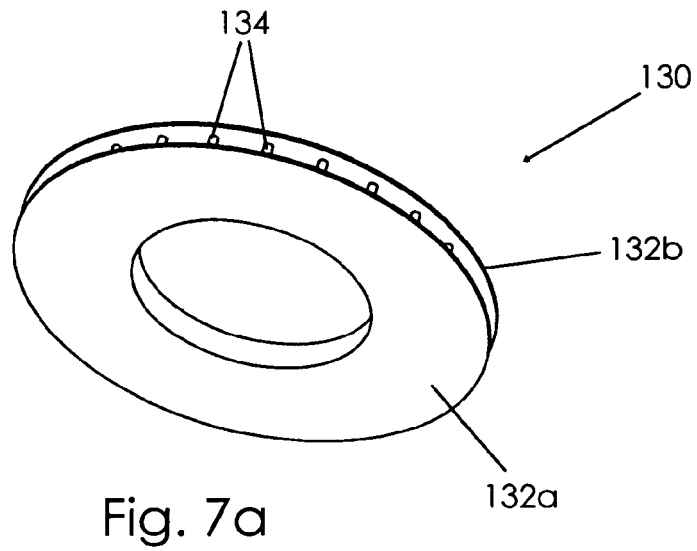
Fig. 7a
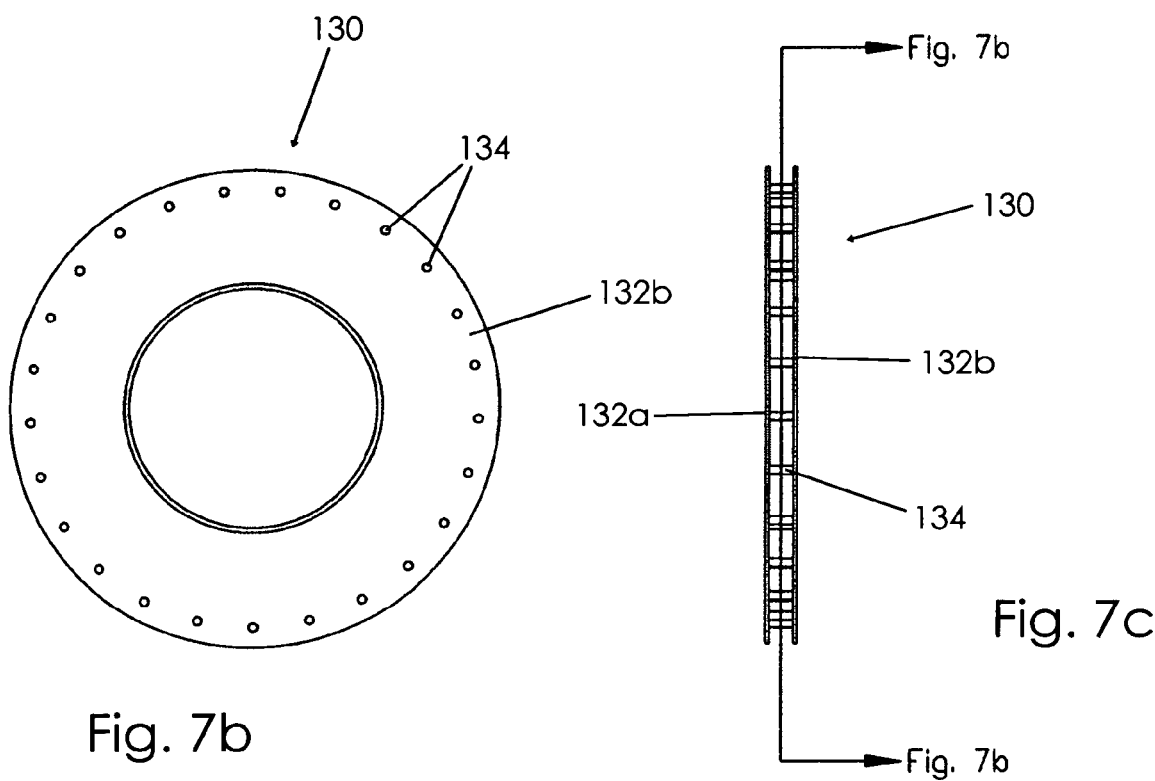
Fig. 7b
Fig. 7c

TRACTION ENHANCEMENT DEVICE

BACKGROUND OF THE INVENTION

This invention relates generally to vehicle traction devices and, more particularly, to a traction enhancement device for use with a vehicle having dual tandem wheels. More particularly, the present invention provides enhanced traction for construction trucks having dual wheels that may otherwise become stuck when operating in muddy conditions.

Rainy weather is often a significant problem for construction companies in that heavy equipment such as construction trucks having tandem wheels may become stuck in the mud. Or, the construction trucks and crews must simply wait until the ground is dry enough to enable the trucks or other heavy equipment to operate without becoming stuck. Having to wait for dry weather before operating construction trucks may cause the predetermined construction schedule to be compromised and to potentially jeopardize the profitability of the job.

Various devices have been proposed in the art for enhancing the traction of vehicles having dual rear tires. Specifically, interlinked track pads have been proposed that surround the tires and wheels which turn along with the wheels and which spread the weight of the vehicle over a wider surface area to prevent the vehicle from getting stuck. Although assumably effective for their intended purposes, the existing or previously proposed devices have required structures that either surround the outer edges of the tires or included other means for maintaining the track assembly in proper alignment upon the wheels.

Therefore, it would be desirable to have an enhanced traction device for use on vehicles that have dual tandem wheels for reducing the chances that the vehicle will get stuck in the muddiest of weather conditions. Further, it would be desirable to have an enhanced traction device that maintains its plurality of track pads upon the tandem wheels using a plurality of alignment portions or a spacer positioned to extend between the tandem wheels of the vehicle.

SUMMARY OF THE INVENTION

An enhanced traction device for use with a vehicle having dual tandem wheels according to the present invention includes a series of generally parallel track pads, each track pad having an alignment portion and a traction portion defining first and second ends. Each traction portion includes an inner surface for contacting the vehicle wheels and an outer surface for contacting ground. Each alignment portion extends away from a respective traction portion outer surface and is configured to pass between the dual wheels. The alignment portions, therefore, maintain proper positioning of the track pads upon the dual tandem wheels of the vehicle.

The enhanced traction device further includes a first chain coupled to each respective track pad first end for maintaining a predetermined spacing between said track pad first ends. Similarly, the traction device includes a second chain coupled to each track pad second end for maintaining a predetermined spacing between the track pad second ends.

Each respective set of dual wheels is coupled to a respective axle of the vehicle. The traction device may include a spacer configured to be fixedly attached to a respective axle between respective dual wheels. The spacer includes first and second faces separated by a plurality of load bearing members, the load bearing members having a configuration complementary to a configuration of the track pad alignment portions whereby rotation of the spacer forces movement of the track pad alignment portions.

Therefore, a general object of the present invention is to provide an enhanced traction device that may be mounted to the dual tandem wheels of a construction vehicle for enabling the vehicle to operate in muddy conditions without getting stuck.

Another object of this invention is to provide an enhanced traction device, as aforesaid, that maintains its alignment on the dual tandem wheels by having a plurality of alignment portions configured to pass between the dual wheels of the vehicle.

Still another object of this invention is to provide an enhanced traction device, as aforesaid, having a plurality of traction pads that are spaced apart and configured in parallel to extend over the width of the tandem wheels and to contact the ground as the tandem wheels turn.

Yet another object of this invention is to provide an enhanced traction device, as aforesaid, that is durable and reliable in tough weather conditions.

A further object of this invention is to provide an enhanced traction device, as aforesaid, that may be installed or removed efficiently from the dual tandem wheels.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a sectional view taken along line 2b-2b of FIG. 2a;

FIG. 3b is an isolated view on an enlarged scale of a portion of the traction device taken from FIG. 3a;

FIG. 4b is an isolated view on an enlarged scale of a portion of the traction device taken from FIG. 4a;

FIG. 5a is a side view of the traction device as in FIG. 4a;

FIG. 5b is a front view of the traction device as in FIG. 5a;

FIG. 5c is another perspective view of the traction device as in FIG. 4a;

FIG. 7a is a perspective view of a spacer according to another embodiment of the present invention;

FIG. 7b is a sectional view of the spacer taken along line 7b-7b of FIG. 7c;

FIG. 7c is a top view of the spacer as in FIG. 7a;

FIG. 8a is a top view of the traction device in use with the spacer of FIG. 7a; and FIG. 8b is a sectional view taken along line 8b-8b of FIG. 8a.

DESCRIPTION OF THE PREFERRED EMBODIMENT

Figure 1:
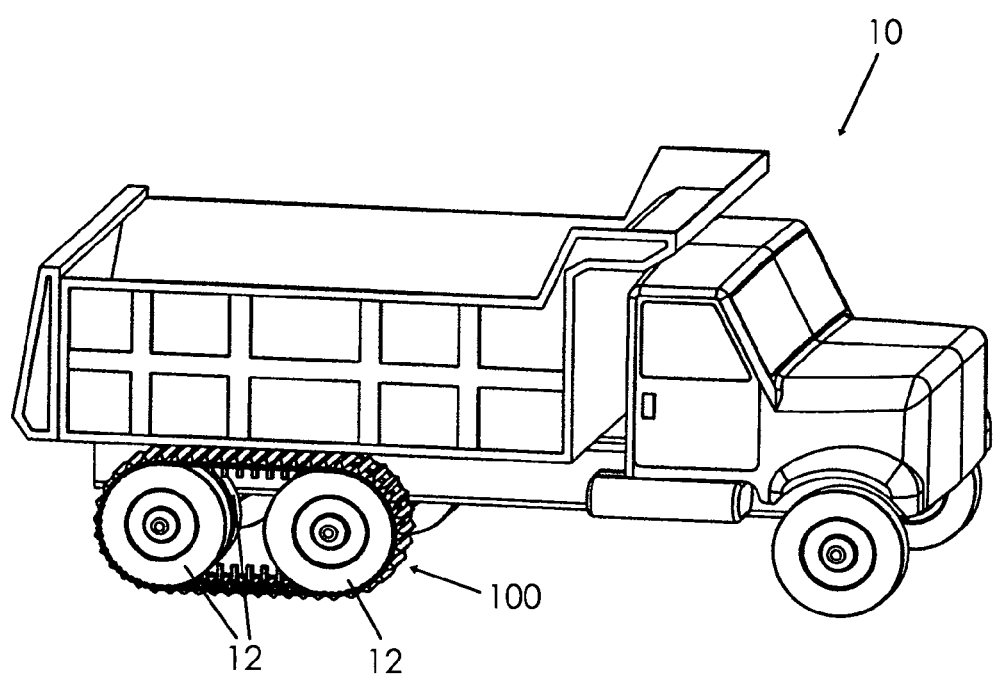
FIG. 1 is a perspective view of an enhanced traction device installed on a vehicle having dual tandem wheels according to an embodiment of the present invention.

A traction enhancement device 100 for use with a vehicle 10 having dual tandem wheels 12 according to the present invention will now be described in detail with reference to FIGS. 1 through 8b of the accompanying drawings. More particularly, a traction enhancement device 100 according to the current invention includes a plurality of track pads 110, a first chain 120, and a second chain 125.

Figure 2A:
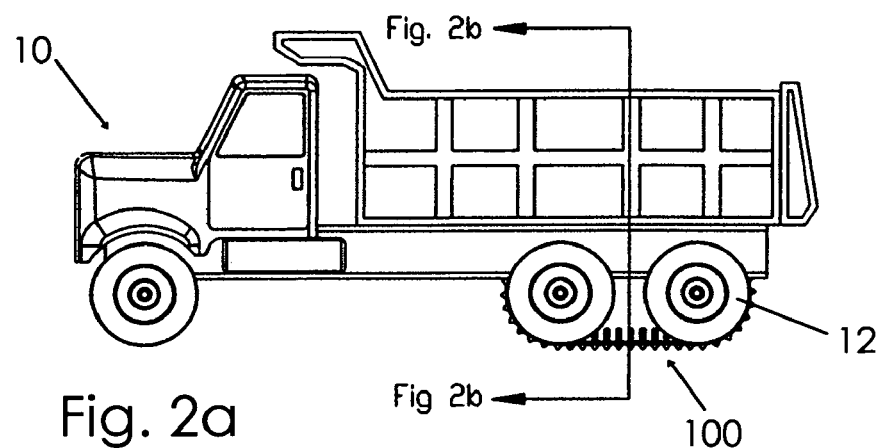
FIG. 2a is a side view of the traction device and vehicle as in FIG. 1.
Figure 2B:
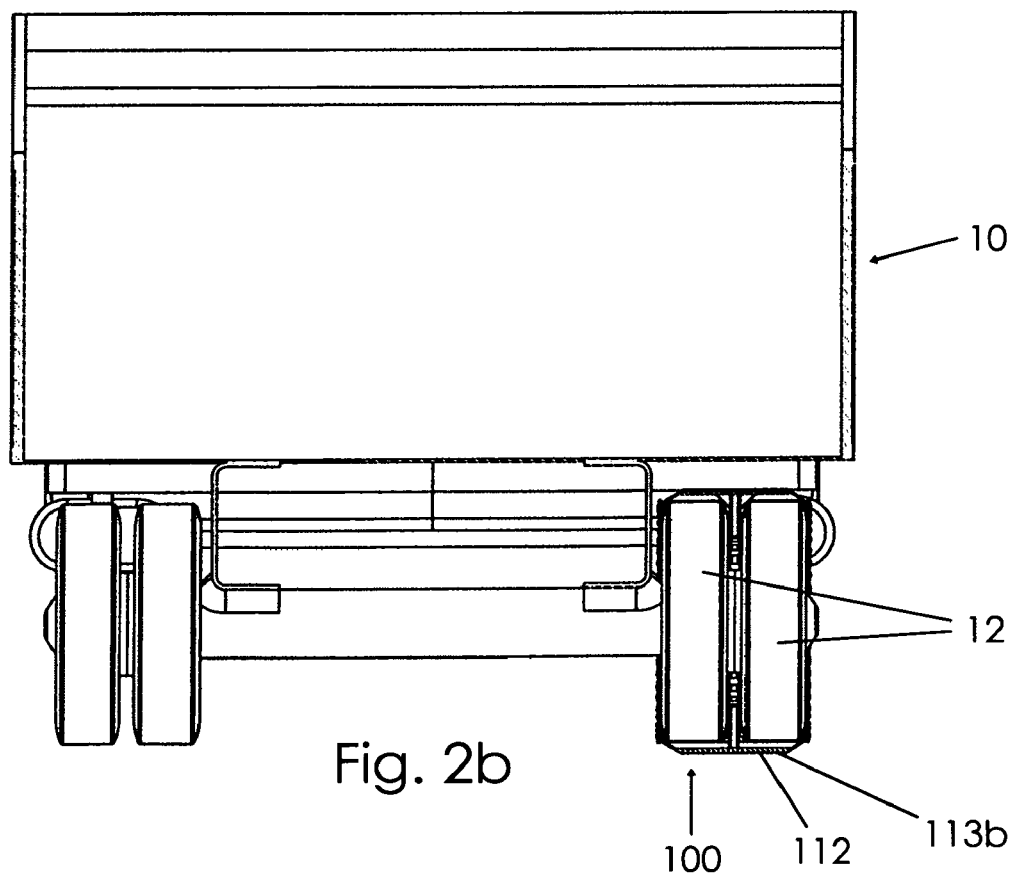
Figure 3A:
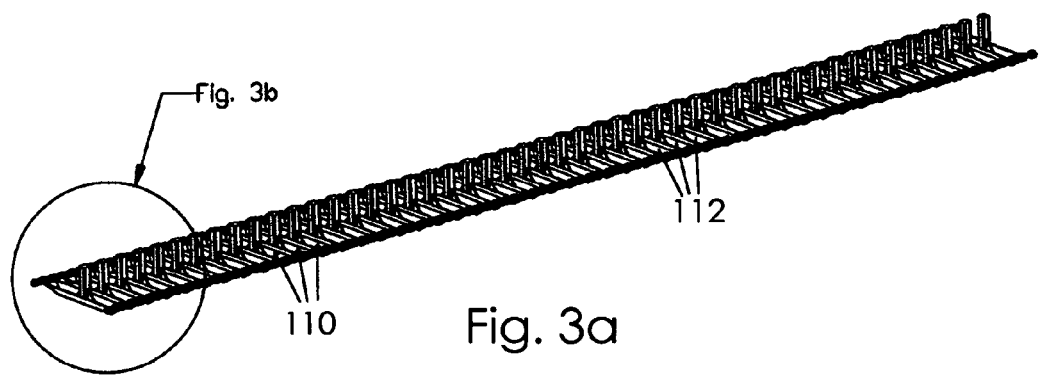
FIG. 3a is a perspective view of the traction device removed from the tandem wheels.
Figure 3B:
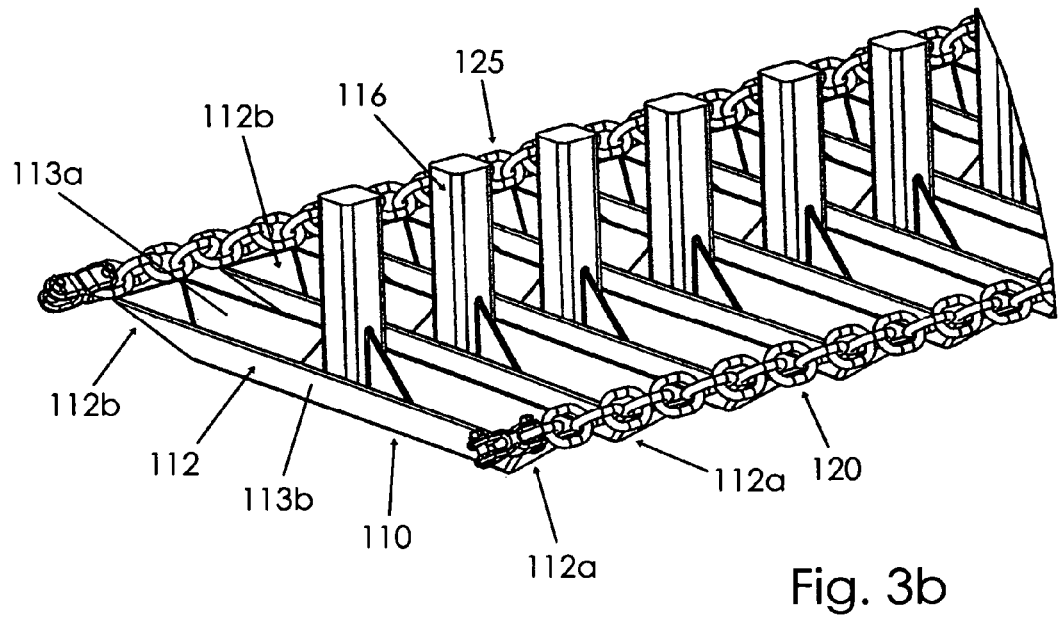

Each track pad 110 has a traction portion 112 and an alignment portion 116, as shown in FIG. 3b. The traction portion 112 defines first and second ends 112a, 112b, has an inner surface 113a for contacting the wheels 12, and an outer surface 113b for contacting ground. The traction portion 112 may have a generally triangular cross section (as shown in FIG. 4b) or any other appropriate configuration. As shown in FIG. 2b, the track pad 110 may have a width that is sufficient to extend across each set of the dual wheels 12.

As best shown in FIG. 3b, the first chain 120 may be coupled to the first end 112a of each track pad 110 to maintain a predetermined spacing between the track pad first ends 112a; the second chain 125 may be coupled to the second end 112b of each track pad 110 to maintain a predetermined spacing between the track pad second ends 112b. The chains 120, 125 may be welded to the track pads 110 or coupled thereto in another appropriate manner, and it should be appreciated that the chains need not be coupled at the edges of the first and second ends 112a, 112b as shown in FIG. 3b. The predetermined spacing between the track pad first ends 112a may be generally equal to the predetermined spacing between the track pad second ends 112b, or the track pads 110 may otherwise be coupled together to form a series of generally parallel track pads 110 (FIGS. 3a and 3b). It should be apparent to one of ordinary skill in the art that "predetermined spacing" as used herein simply means a selected spacing, and that the selected spacing may vary based on factors such as size and spacing of the wheels 12.

Figure 4A:
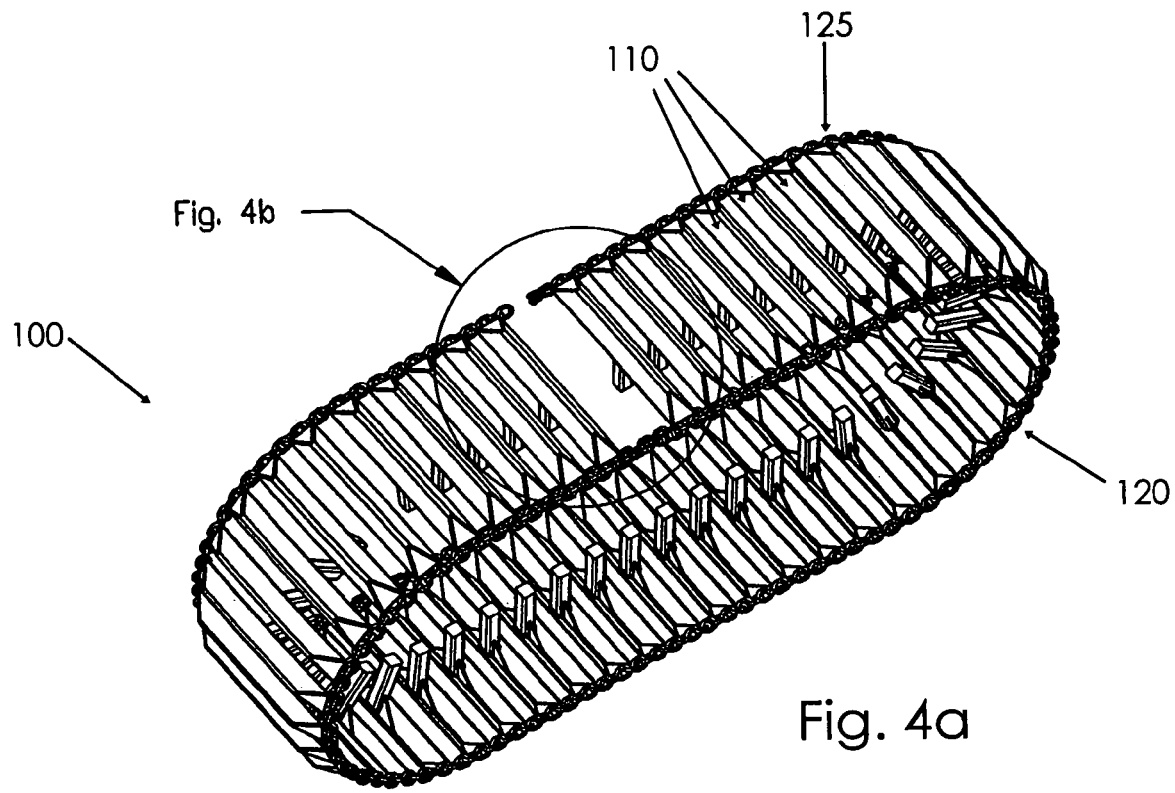
FIG. 4a is a perspective view of the traction device as in FIG. 1 with the vehicle and tandem wheels removed.
Figure 4B:
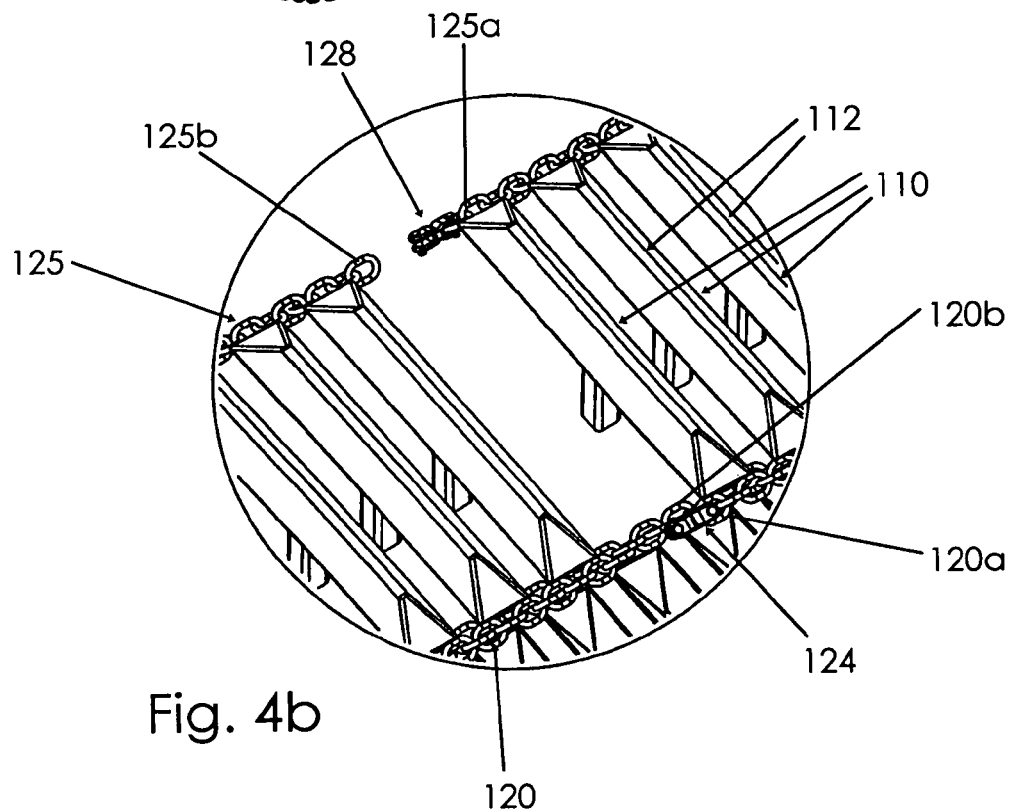
Figures 5A, 5B, 5C:
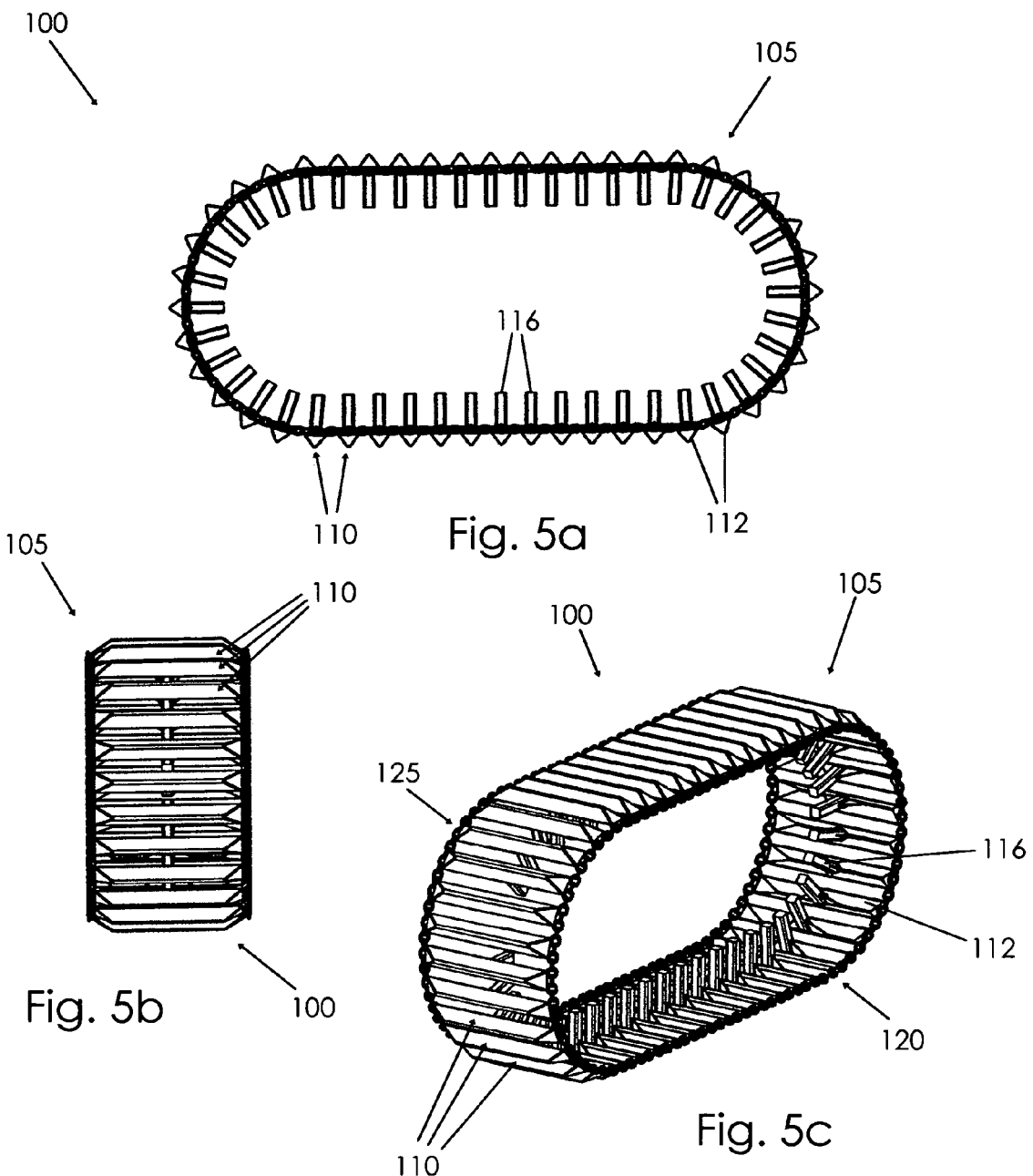

As shown in FIGS. 4a and 4b, the first chain 120 may have first and second ends 120a, 120b, and a midlink 124 may selectively couple the first and second ends 120a, 120b of the first chain 120 together to form a loop. Similarly, the second chain 125 may have first and second ends 125a, 125b, and a midlink 128 may selectively couple the first and second ends 125a, 125b of the second chain 125 together to form a loop. When both the first and second chains 120, 125 form respective loops, a loop 105 of the track pads 110 may result (FIGS. 5a through 5c).

Figure 6A:
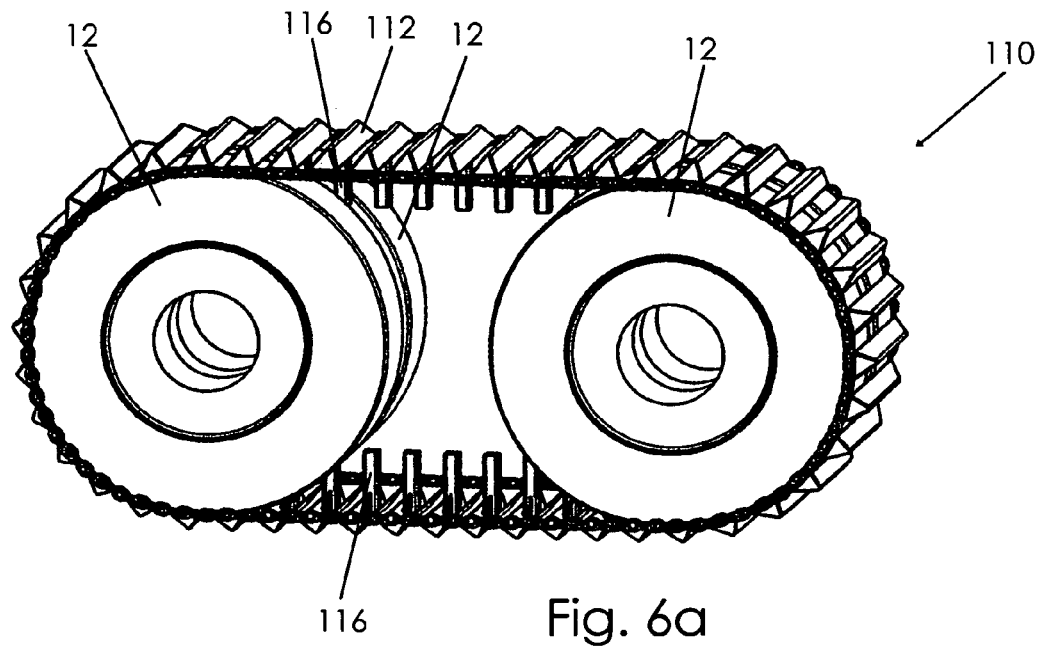
FIG. 6a is a perspective view of a portion of the traction device as in FIG. 1 with the vehicle removed to illustrate the traction device installed on one set of dual tandem wheels.
Figure 6B:
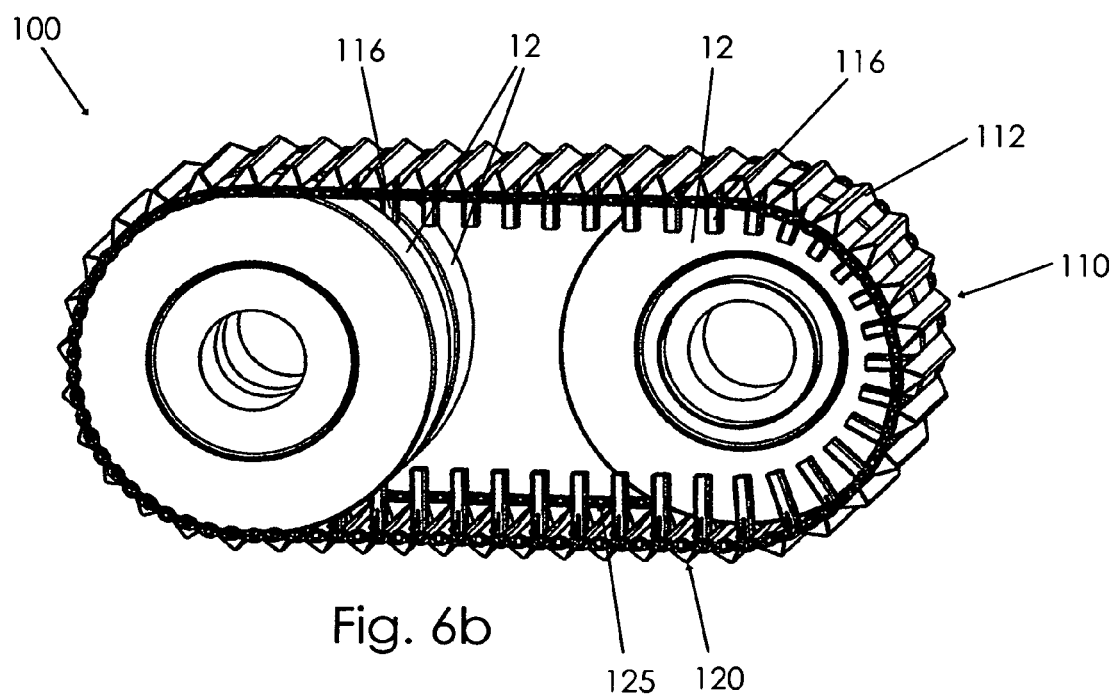
FIG. 6b is a perspective view of the traction device as in FIG. 6a with one of the dual wheels removed.

Returning to FIG. 3b, each track pad alignment portion 116 may extend generally perpendicularly from a respective traction portion 112 away from a respective traction portion outer surface 113b. Each track pad alignment portion 116 being secured within a recess formed in a respective traction portion 112. As shown in FIGS. 6a and 6b, the alignment portion 116 may be configured to pass between the dual wheels 12. In one embodiment, the location of the alignment portions 116 between the dual wheels 12 may keep the traction portions 112 in place on the wheels 12. To minimize damage to the wheels 12 by the alignment portions 116, the alignment portions 116 may contact a spacer instead of the actual wheels 12.

Figure 8A:
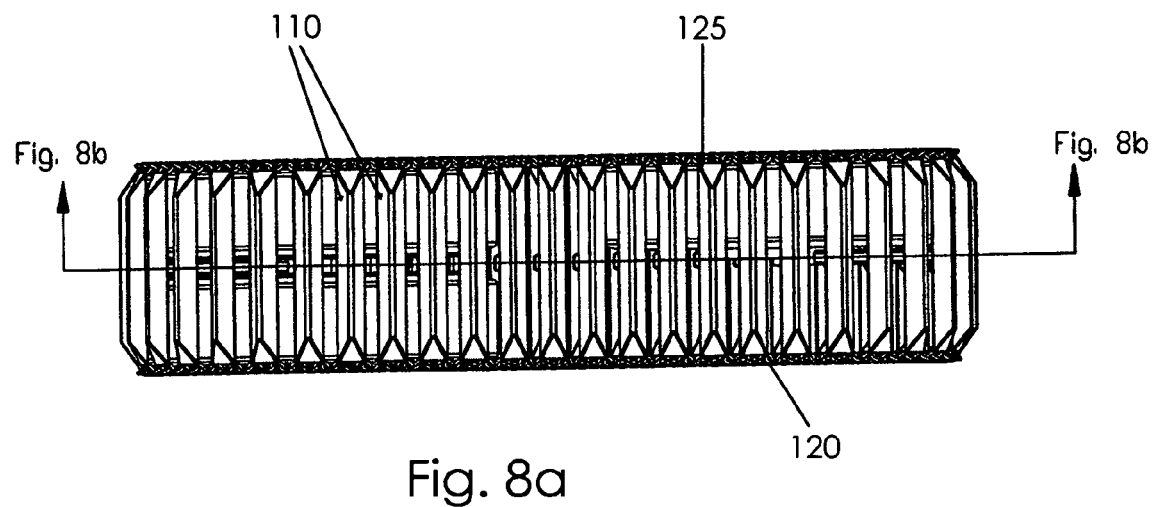
Figure 8B:
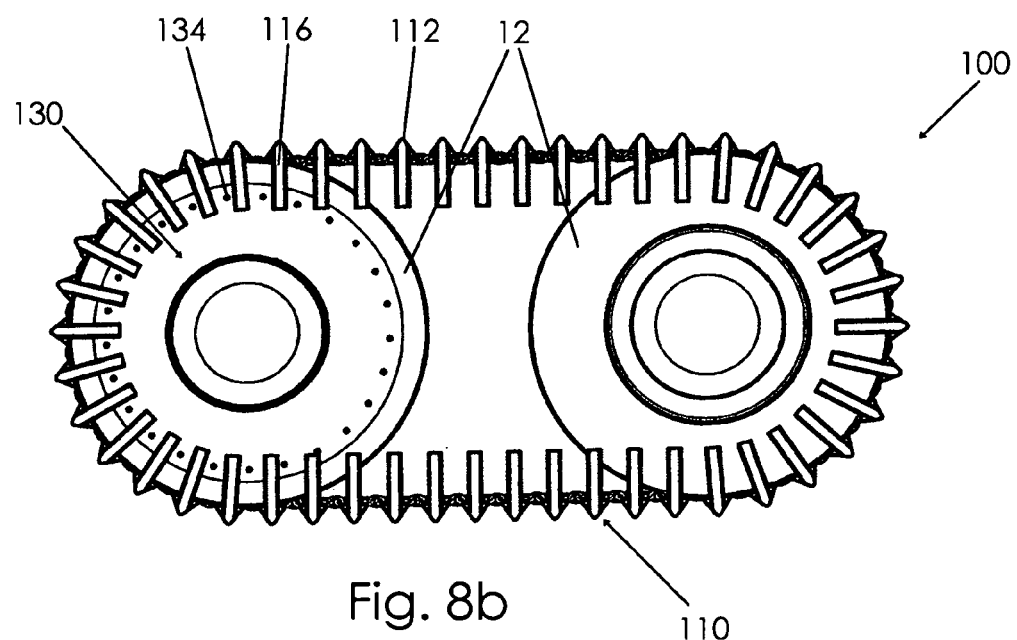

In one embodiment (set forth in FIGS. 7a through 8b), a spacer 130 may be configured for fixed attachment to an axle or a wheel 12 so as to be positioned between respective dual wheels 12. In other words, the spacer 130 may be locked together with the axle or wheel 12 in a permanent or non-permanent manner. The spacer 130 shown in FIGS. 7a through 7c has first and second planar faces 132a, 132b that are parallel to one another and a plurality of load bearing members 134 therebetween. The load bearing members 134 shown in FIGS. 7a through 7c are spokes separating the faces 132a, 132b, though other load bearing members (e.g., gear teeth, etc.) may be used. A force transfer member (e.g., alignment portion 116) may be at least temporarily in communication with the spacer (i.e., a load bearing member 134) and a respective track pad traction portion 112 for transferring force from the spacer 130 to the track pad traction portion 112 (FIG. 8b). In other words, the load bearing members 134 may have a configuration complementary to a configuration of the force transfer members (e.g., alignment portions 116) so that rotation of the spacer causes the force transfer members to move.

In use, a vehicle 10 having dual tandem wheels 12 is provided (FIG. 1). As is known in the art, this means that the vehicle 10 has forward and rearward sets of dual tires 12, and that the tires 12 are attached to respective axles. A respective series of generally parallel track pads 110 (FIGS. 3a and 3b) may be positioned about a respective set of dual tandem wheels 12 so that the alignment portions 116 are positioned between the dual tires 12, and the midlinks 124, 128 may be used to maintain the track pads 110 in a loop as discussed above and shown in FIGS. 4a and 4b. Interaction between a traction portion inner surface 113a and a rotating wheel 12 may cause the traction portions 12 to move and the traction portion outer surfaces 113b to contact a ground surface, thus increasing traction for the vehicle 10. The positioning of the alignment portions 116 between the wheels 12 may maintain the traction portions 112 in line with the wheels 12, and if the spacer 130 shown in FIGS. 7a through 7c is fixed to an axle or wheel 12, rotation of the axle and wheels 12 may cause the load bearing members 134 of the spacer 130 to move the force transfer members (e.g., alignment portions 116) as set forth above.

It is understood that while certain forms of this invention have been illustrated and described, it is not limited thereto except insofar as such limitations are included in the following claims and allowable functional equivalents thereof.

The invention claimed is:

1. A traction enhancement device for use with a vehicle having dual tandem wheels, said device comprising:
a plurality of track pads, each said track pad having a traction portion defining first and second ends and an alignment portion extending generally perpendicularly from said traction portion, said alignment portion having an elongate parallelogram shape that is configured to pass between said dual wheels beyond lower edges of respective traction portions;
a first chain coupled to each said track pad first end for maintaining a predetermined spacing between said track pad first ends;
a second chain coupled to each said track pad second end for maintaining a predetermined spacing between said track pad second ends;
a spacer configured for fixed attachment between respective dual wheels, said spacer having first and second planar faces that are parallel to one another and separated by a plurality of load bearing members, said load bearing members having a configuration complementary to a configuration of said track pad alignment portions such that respective alignment portions are temporarily in communication with respective load bearing members, whereby rotation of said spacer forces movement of said track pad alignment portions;
wherein at least one said traction portion outer surface has a generally triangular cross section;
wherein:
said first chain has first and second ends and includes a single midlink that selectively couples said first and second ends of said first chain;

said second chain has first and second ends and includes a single midlink that selectively couples said first and second ends of said second chain;

wherein a respective midlink is not coupled to every one of said plurality of track pads;

each said track pad has a width sufficient to extend across each said set of dual wheels;

each said traction portion has an inner surface for contacting said wheels and an outer surface for contacting ground; and each said alignment portion is secured within a recess formed in a respective traction portion and extends away from a respective traction portion outer surface.

2. The traction enhancement device as in claim 1, wherein said predetermined spacing between said track pad first ends is generally equal to said predetermined spacing between said track pad second ends.

3. The traction enhancement device as in claim 1, wherein each said track pad has a width sufficient to extend across each said set of dual wheels.

* * * * *